(12) United States Patent
Haley et al.

(10) Patent No.: US 8,306,855 B2
(45) Date of Patent: **\*Nov. 6, 2012**

(54) SYSTEMS AND METHODS FOR PROVIDING A REVERSE FREQUENCY CAP IN ADVERTISEMENT VIEWING

(75) Inventors: Kevin C. Haley, Austin, TX (US); Robert A. Luenberger, Palo Alto, CA (US)

(73) Assignee: AOL Advertising Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,283

(22) Filed: Sep. 19, 2011

(65) Prior Publication Data

US 2012/0010943 A1    Jan. 12, 2012

Related U.S. Application Data

(63) Continuation of application No. 10/963,502, filed on Oct. 14, 2004, now Pat. No. 8,041,602.

(60) Provisional application No. 60/511,724, filed on Oct. 15, 2003.

(51) Int. Cl.
    *G06Q 30/00* (2012.01)
(52) U.S. Cl. ...................................... 705/14.1
(58) Field of Classification Search ............... 705/14.1, 705/144.1
    See application file for complete search history.

(56) References Cited

U.S. PATENT DOCUMENTS

| 5,933,811 A | 8/1999 | Angles et al. |
| 2002/0062245 A1* | 5/2002 | Niu et al. .................. 705/14 |
| 2004/0267611 A1 | 12/2004 | Hoerenz |

FOREIGN PATENT DOCUMENTS

WO    WO 01/24067    *  4/2001

OTHER PUBLICATIONS

Australian Examiner's First Report, dated Aug. 6, 2009, on Australian Patent Application No. 2004284760, 2 pages.
Chinese Office Action, dated Sep. 7, 2007, in Chinese Application No. 200480030529.2, 9 pages.
Chinese Office Action, dated Jul. 24, 2009, in Chinese Application No. 200480030529.2, 8 pages.
European Office Action, dated Jul. 12, 2010, in European Application No. 04793941.8, 6 pages.
PCT International Search Report, dated Oct. 27, 2005, for International Application No. PCT/US04/32306, 3 pages.
PCT Written Opinion of the International Searching Authority, dated Oct. 27, 2005, for International Application No. PCT/US04/32306, 3 pages.

* cited by examiner

*Primary Examiner* — Daniel Lastra
(74) *Attorney, Agent, or Firm* — Finnegan, Henderson, Farabow, Garrett & Dunner, LLP

(57) ABSTRACT

Systems and methods relate to frequency of advertisement viewing on the Internet, and more specifically to controlling advertisement viewings by a person during an advertising cycle. A probability of return for a customer is evaluated and an advertisement is shown to the customer based on a function of at least the probability of return and a value for the return. Once the customer has seen the advertisement a target number of times, the customer is no longer shown the advertisement.

21 Claims, 5 Drawing Sheets

SYSTEMS AND METHODS FOR PROVIDING A REVERSE FREQUENCY CAP IN ADVERTISEMENT VIEWING

RELATED APPLICATION

This application is a continuation of U.S. application Ser. No. 10/963,502, filed Oct. 14, 2004 now U.S. Pat. No. 8,041,602, and claims the benefit of priority from U.S. Provisional Application No. 60/511,724, entitled "Reverse Frequency Capping," filed Oct. 15, 2003, the disclosures of which are expressly incorporated herein by reference.

TECHNICAL FIELD

The present invention generally relates to frequency of advertisement viewing on the Internet, and more specifically to controlling advertisement viewings by a person during an advertising cycle.

BACKGROUND

The number of users on the Internet continues to grow at an astounding rate while businesses continue to rapidly commercialize its use As users surf through websites, they generate a high volume of traffic over the Internet. Increasingly, businesses take advantage of this traffic by advertising their products or services on the Internet. These advertisements may appear in the form of leased advertising space, often called "banners," on websites, which are similar to rented billboard space in highways and cities or commercials broadcasted during television/radio programs.

Optimal advertisement placement has become a critical competitive advantage for the Internet advertising business. Users are spending an ever-increasing amount of time online viewing web pages that can be customized to fit a user profile.

One method for valuing exposure of advertisements posted on a website may be based on frequency of exposure. This method allows one to control the frequency of exposure of an advertisement by, among other things, predicting the exposure (i.e., number of impressions, viewers, actions, website hits, mouse clicks, etc.) on a given website or group of websites during an advertising campaign. Advertisers favor specific frequencies and do not want a user to become too inundated in advertisement viewing. At the same time advertisers also do not want a user to be under-exposed and thus an uninterested or inattentive customer.

Arrangements with advertisers tend to be composed of campaigns, each lasting from days to weeks. The advertisers may have a target frequency for each viewer, i.e., show the advertisement a specified number of times to each customer, such as 5 times, possibly at intervals of once every 7 days. Once a customer views the campaign the $5^{th}$ time, the advertisement can stop being shown to the customer. This process is referred to as a frequency cap.

FIG. 1 illustrates, using a histogram, the frequency of views by the number of people viewing an advertisement under a traditional method of frequency capping. As shown, during a campaign, a high number of people will see the advertisement the preferred number of viewing times (i.e., 5 views). Unfortunately, a large number of people who have seen the advertisement less than the preferred number of viewing times are left (i.e., 1, 2, 3, or 4 views).

Thus, there is a need for a method of increasing the number of people who see an advertisement the preferred number of viewings and decreasing the number of people who see an advertisement less then the preferred number of viewings. Furthermore, there is a need for a method to control the frequency of viewing the advertisement.

SUMMARY

Consistent with the present invention, a method controls the frequency of advertisement viewings by a customer during an advertising cycle. The method comprises evaluating a probability of return for the customer; evaluating a value for the return; and showing an advertisement to the customer based on a function of at least the probability of return and the value for the return.

Consistent with the present invention, a method controls advertisement viewing frequency. The method comprises displaying an advertisement to a target number of persons within a group based on the tendency of the persons in the group to return to a website; determining a turning point time; and displaying the advertisement only to the persons who have already seen it at least once before after the determined turning point time.

Consistent with the present invention, a method controls advertisement viewing frequency. The method comprises evaluating a customer's expected number of visits during which an advertisement may be displayed; displaying the advertisement to the customer when the customer is expected to view the advertisement at least a target number of times; and displaying the advertisement again until the customer has seen the advertisement the target number of times.

Consistent with the present invention, a system controls advertisement viewing frequency. The system comprises a storage device and a processor, wherein the processor executes instructions to display an advertisement to a target number of persons within a group based on a tendency of the persons in the group to return to a website, determine a turning point time and, after the determined turning point time, display the advertisement only to the persons who have already seen it at least once before.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference is now made in detail to exemplary embodiments of the invention, examples of which are illustrated in the accompanying drawings. Wherever possible, the same reference numbers are used throughout the drawings to refer to the same or like parts.

The term "customer," "user," or "person" refers to any consumer, viewer, or visitor of a Web page or site and can also refer to the aggregation of individual customers into certain groupings. References to customers "viewing" ads is meant to include any presentation, whether visual, aural, or a combination thereof. A set of attributes is associated with each customer. The attributes reflect the customer's interests and they incorporate the characteristics that impact advertisement selection.

Figure 1:
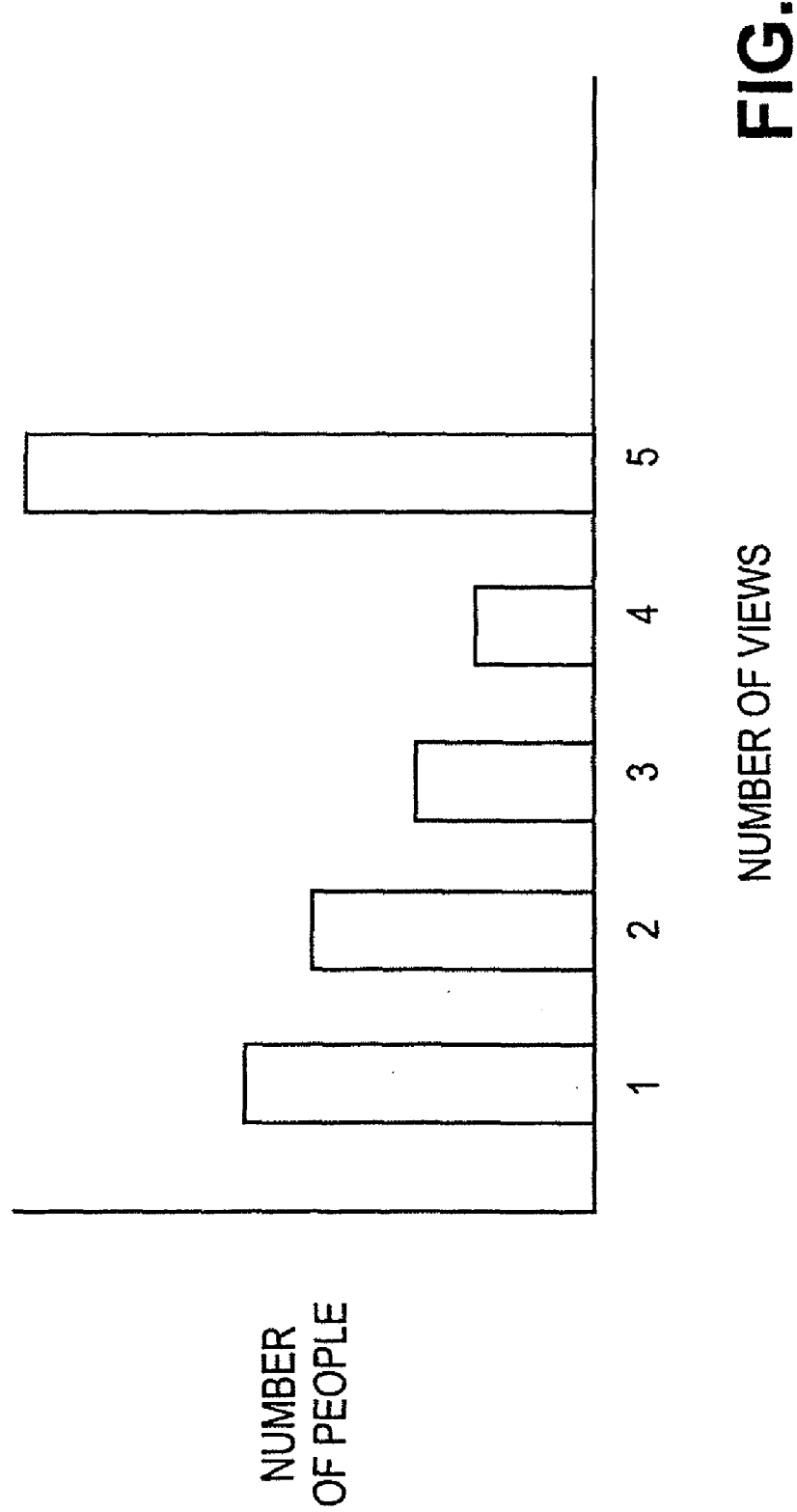
FIG. 1 illustrates a pattern of advertisement viewing consistent with the prior art.
Figure 2:
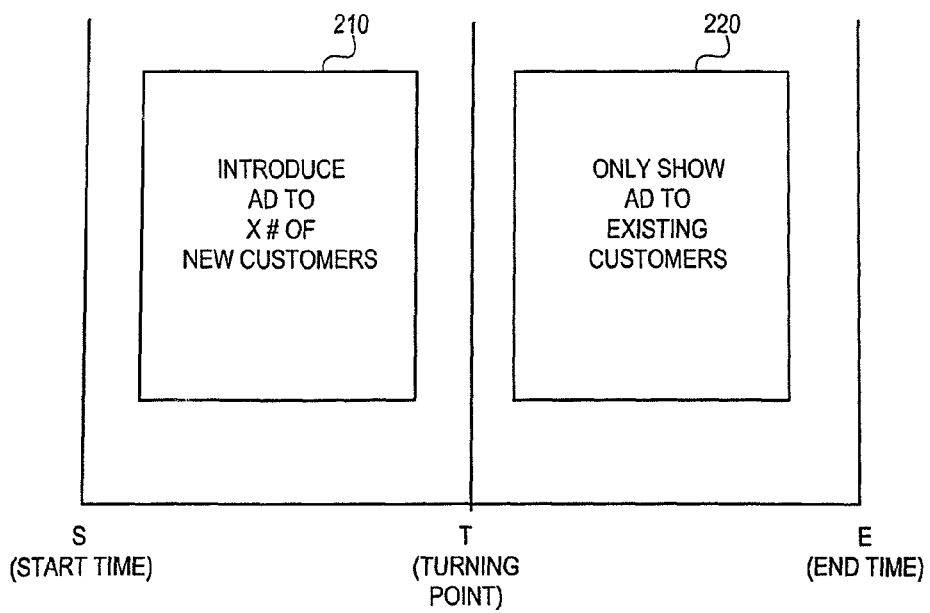
FIG. 2 illustrates one embodiment of perfect reach and frequency, consistent with features and principles of the present invention.

For each customer, data exists describing the customer's tendency to return to a specific web site in a given period of time. This data may be initially generated using estimated figures based on known customer attributes. The estimated figures may be modified over time using customer viewing logs. Customer viewing logs may be created by storing the viewing patterns of a customer over an extended period of time. For example, cookies stored locally on a customer's computer may be accessed to identify the customer and to determine the last time that the customer viewed the advertisement and/or a web page. In addition, in instances when a cookie is unavailable, a virtual cookie may be used. A virtual cookie may be derived from available information such as the customer's IP address, browser type, geographic location, connection speed, or any other accessible and appropriate session level data FIG. 2 illustrates one embodiment of perfect reach and frequency. For an advertiser who has a target number of views during a campaign lasting from start time S to end time E, a two-phase plan is used to achieve the advertiser's objective. First the advertisement is shown to a certain number of people within groups based on the tendency of the people in the group to return to a website, the value of this advertising contract, and the value of this group of people to other advertisers (group 210). The advertisement is shown to members of group 210 some or every time they return to the website or to a group of websites in order to obtain the advertiser's target number of views between S and E.

Second, at a certain time, turning point T, people who have not seen the advertisement before are excluded from viewing the advertisement, meaning that they will never be shown the advertisement. Thus after time T, advertisements are only shown to people who have already seen it at least once before (group 220). In an embodiment of the present invention, group 220 is a subset of group 210. Throughout the process, a normal frequency cap at the advertiser's desired level is maintained. That is, once Customer X has seen the advertisement the targeted number of times, it is no longer shown to Customer X.

In order to implement this process, time T, the point at which an advertisement is shown only to customers that have already viewed the advertisement at least once, needs to be determined. The time from time S to time T should be a period long enough to get enough people into group 210 so that by time E, the most customers possible have viewed the advertisement the targeted number of times. The value of T and the size of group 210 are related. Thus, to find the optimal time T, the number of people in group 210 needs to be determined. This valuation may be based on an estimate of the value of an initial showing of an advertisement maturing into the target number of views of that advertisement. This estimate comes from: (1) viewing probability estimates; and (2) uncertainties for each customer.

The viewing probabilities and estimates are determined using customer attributes that cover all of the distinctive characteristics of the customer. A customer may be associated with a common set of attributes and/or a multi-tiered set of attributes. A common set of attributes may be, for example, sex, age, job status, income level, time of day of connection to internet, type of internet connection, and type of internet browser. The multi-tiered set of attributes may include a base set of attributes based on easily available data, such as sex, and a second set of attributes based on specifically tracked actions, such as interest in sports. A specific attribute of interest is the value for an impression (i.e., a single viewing of an advertisement) based upon a probability that that same customer will be back "n" more times in order to reach a pre-set number of views. This probability may be determined using historic reach and frequency data at the segment level within any collection of groups of people or properties. For example, this may include a collection of digital media and commerce properties. Another example may be the Advertsing.com web network. For example, historic reach and frequency data may include data about a customers' history of returning to a given website.

Figure 3:
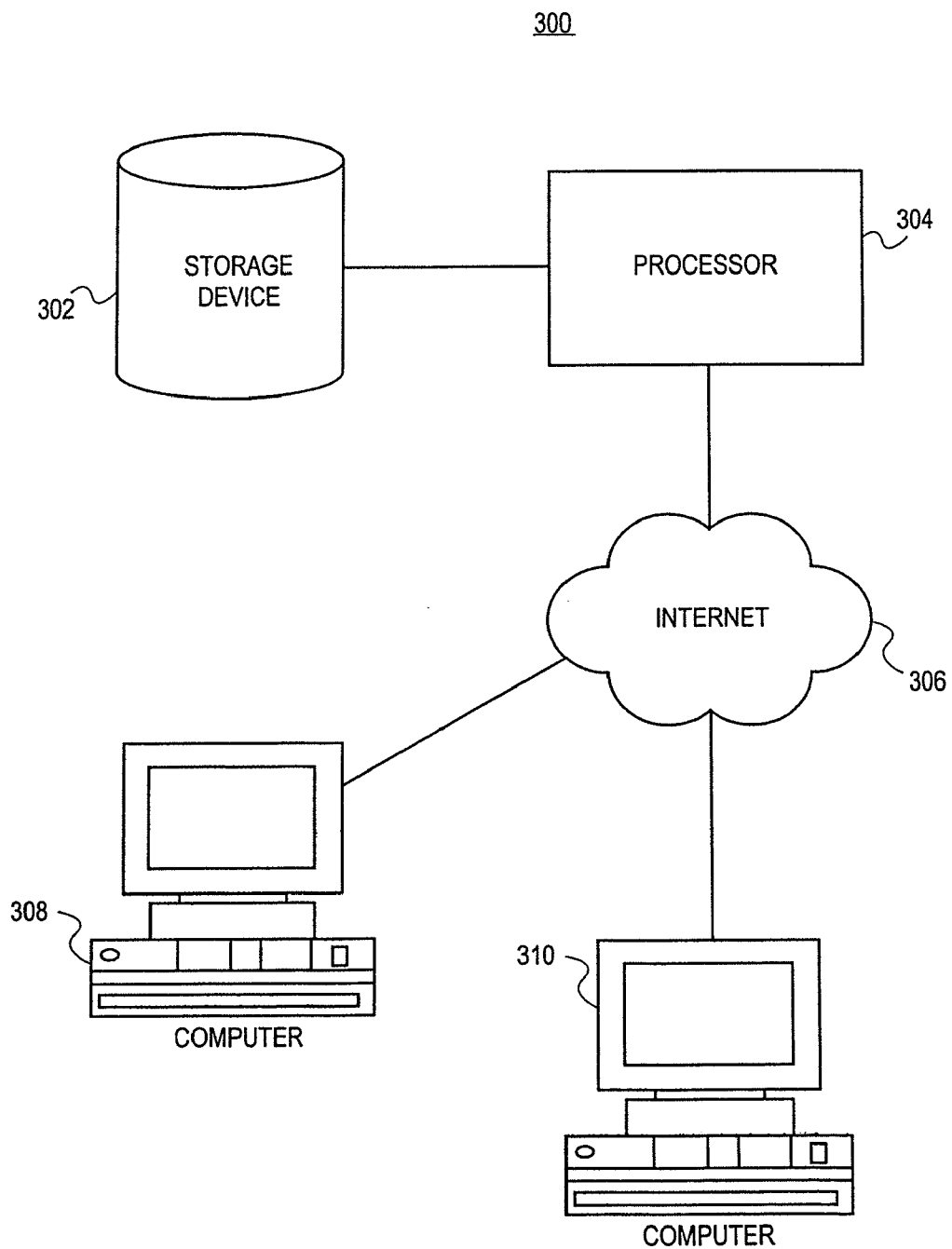
FIG. 3 illustrates an exemplary system for controlling frequency consistent with features and principles of the present invention.

FIG. 3 illustrates an exemplary system 300 for controlling advertisement viewing frequency, including a storage device 302, a processor 304, a network 306, a computer 308, and a computer 310. Processor 304 may be coupled to storage device 302 and network 306. Network 306 may be coupled to computers 308 and 310. Storage device 302 may be implemented using hard drives, floppy disks, ROM, RAM, and/or any other mechanisms for saving data Processor 304 may be implemented using computers, application-specific integrated circuits, CPUs, and/or any other device that is capable of following instructions and/or manipulating data. Network 306 may be implemented via the Internet, wide area networks, local area networks, telephone networks, and/or any other mechanism that can facilitate remote communications. Computers 308 and 310 may be personal computers, desktops, mainframes, and/or any other computing device. One skilled in the art will appreciate that system 300 may include fewer or more storage devices, processors, networks, and computers.

Figure 4:
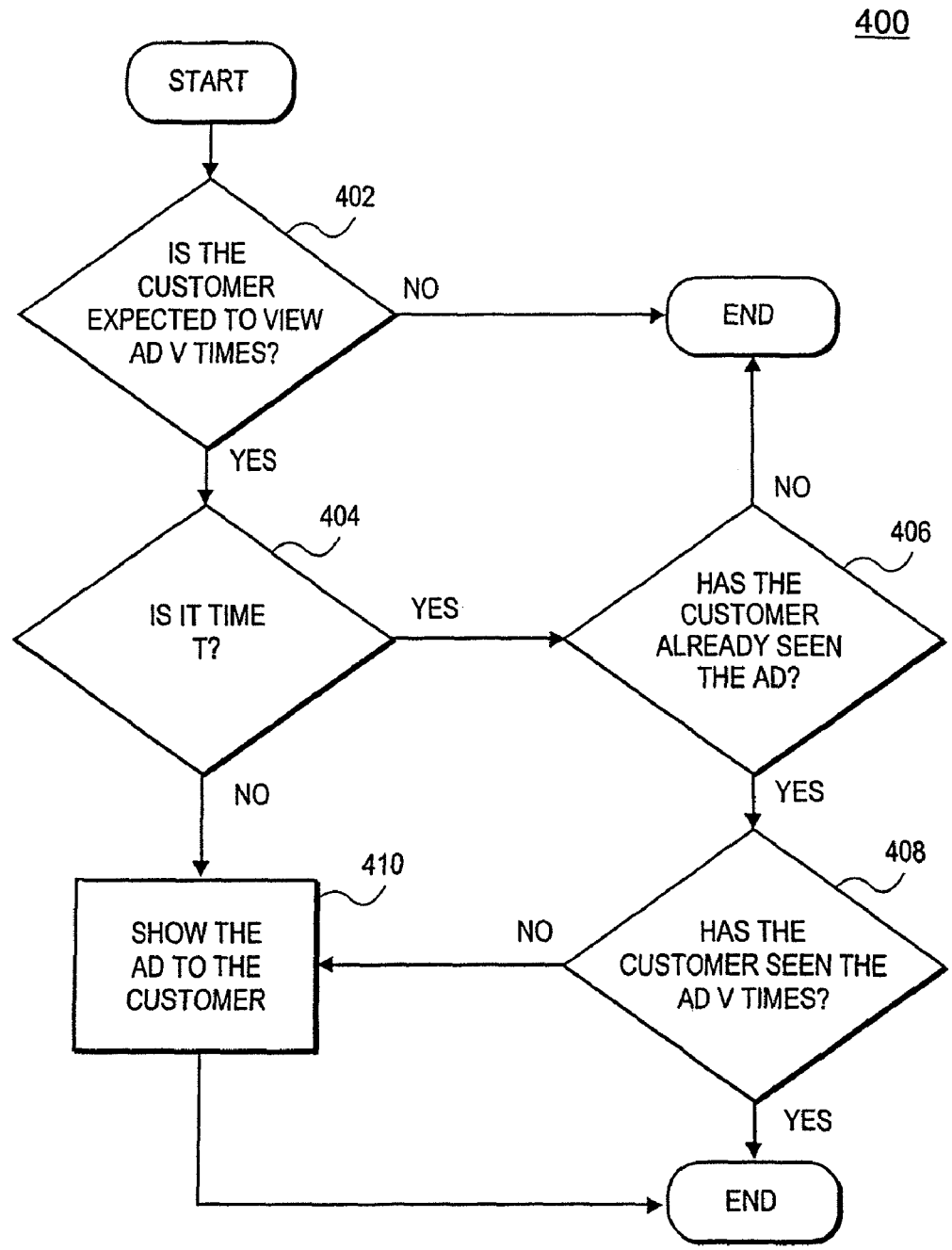
FIG. 4 illustrates an exemplary method for controlling frequency consistent with features and principles of the present invention.

FIG. 4 illustrates an exemplary method 400 for controlling advertisement viewing frequency. A customer's expected viewing probability is evaluated (step 402). Evaluation of frequency and tendency to return to a specific website may be derived from information previously collected concerning customers falling into different demographic groups, for example. This information may include an evaluation of frequency and tendency to return to a specific website.

In one embodiment, this may be a function of the probability of a customer returning V times and the value of that number of returns. This amount may then be compared to the best alternative, such as showing a simple advertisement that is not being tracked for frequency capping. For example, Customer X may have a 40% chance of returning to the website 4 times, and this number of returns is valued at $50. Thus the potential value is 0.40*$50, or $20.

The alternative is to show an advertisement that will only earn $0.04 per viewing, resulting in a known value of only $0.04 for a total of $0.16 for the four views. When the alternative value is compared to the potential value, the potential value of showing the advertisement to Customer X is greater than the alternative known value. Thus in this embodiment, the value of showing the advertisement, considering among other things, the value of the probability of the customer returning, is great enough to show the advertisement to the customer (402, YES).

If the customer is not expected to view an advertisement V times (402, NO), then no advertisement is ever shown to a customer. If a customer is expected to view an advertisement V time (402, YES), then a check on the time is performed (404). If it is not yet time T and a customer is expected to view an advertisement V times, then the customer may be put into group 210 (FIG. 2). If time T has passed (404, YES), then whether the customer has already seen the advertisement is checked (406). A customer who has already seen the advertisement at least once is in group 220 (FIG. 2). If the customer has not seen the advertisement (406, NO), then a different advertisement is shown to the customer. If the customer has seen the advertisement before and is thus in group 220 (406, YES), then the number of times the customer saw the advertisement is checked (408). If the customer saw the advertisement V times (408, YES), then the process is complete with perfect frequency reached. If the customer has not seen the advertisement V times (408, NO) or it is not time T (404, NO), then the advertisement is shown to the customer.

Figure 5:
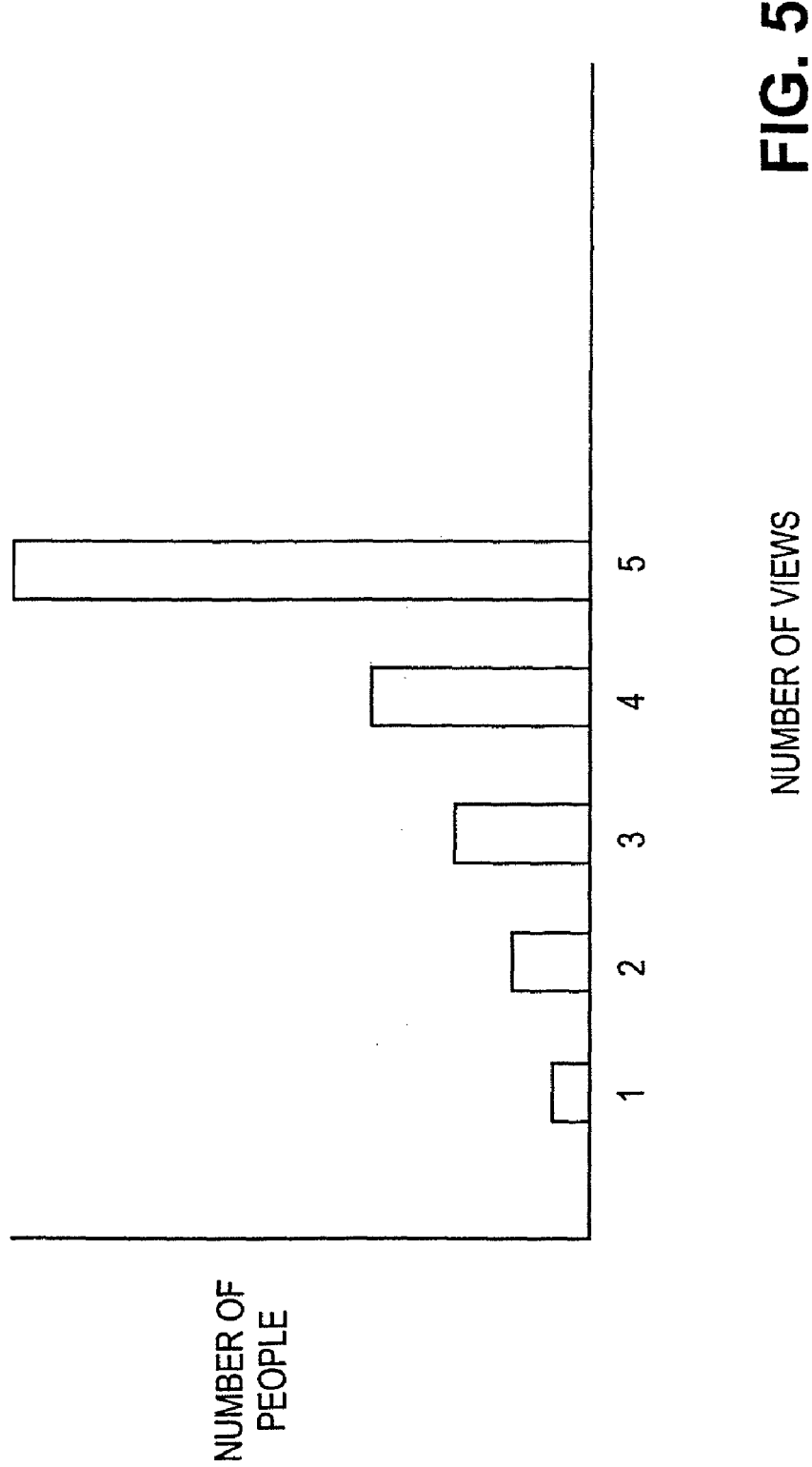
FIG. 5 illustrates an exemplary pattern of advertisement viewing consistent with features and principles of the present invention.

As shown in FIG. 5, using this process, the histogram of the frequency of views by the number of people is modified from the traditional method. The number of people seeing the advertisement V times (i.e., 5 times in the example of FIG. 5) is increased and the number of people who do not view the advertisement V times (i.e., fewer than 5 times) is decreased.

In the foregoing description, various features are grouped together in various embodiments for purposes of streamlining the disclosure. This method of disclosure is not to be interpreted as reflecting an intention that the claimed invention requires more features than are expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of the invention. Furthermore, as used herein, the words "may" and "may be" are to be interpreted in an open-ended, non-restrictive manner.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for controlling the display of advertisements, comprising:
    sending, by a processor, instructions to display an advertisement to a target group of users;
    determining, by the processor, a turning point time, the turning point time corresponding to a time at which a predetermined number of users within the target group have viewed the advertisement a target number of times, the advertisement being displayed to the users via one or more websites; and
    after the determined turning point time has been reached, sending instructions to display the advertisement only to the users in the group who have already seen the advertisement at least once before.

2. The computer-implemented method of claim 1, wherein the advertisement is displayed to the target group of users based on the tendency of the users in the group to return to the one or more websites.

3. The computer-implemented method of claim 2, wherein the tendency of the users in the group to return to the one or more websites is determined by accessing one or more cookies stored on the computers of the users.

4. The computer-implemented method of claim 2, wherein the tendency of the users in the group to return to the one or more websites is derived from one or more virtual cookies.

5. The computer-implemented method of claim 4, wherein the one or more virtual cookies are derived from one or more of an IP address, browser type, geographic location, connection speed, or other session level data.

6. The computer-implemented method of claim 1, wherein the target group is formed by associating users with at least one attribute.

7. The computer-implemented method of claim 6, wherein attributes may be selected from the group of sex, age, job status, income level, time of day of connection to internet, type of internet connection, and type of internet browser.

8. A system for controlling advertisement viewing frequency, comprising:
    a storage device storing instructions; and
    a processor, wherein the processor executes the instructions to
        send instructions to display, prior to a turning point time, an advertisement to a target group of users, the turning point time corresponding to a time at which a predetermined number of users within the target group have viewed the advertisement a target number of times, the advertisement being displayed to the users via one or more websites; and
        after the determined turning point time has been reached, sending instructions to display the advertisement only to the users in the group who have already seen the advertisement at least once before.

9. The system of claim 8, wherein the advertisement is displayed to the target group of users based on the tendency of the users in the group to return to the one or more websites.

10. The system of claim 9, wherein the tendency of the users in the group to return to the one or more websites is determined by accessing one or more cookies stored on the computers of the users.

11. The system of claim 9, wherein the tendency of the users in the group to return to the one or more websites is derived from one or more virtual cookies.

12. The system of claim 11, wherein the one or more virtual cookies are derived from one or more of an IP address, browser type, geographic location, connection speed, or other session level data.

13. The system of claim 8, wherein the target group is formed by associating users with at least one attribute.

14. The system of claim 13, wherein attributes may be selected from the group of sex, age, job status, income level, time of day of connection to internet, type of internet connection, and type of internet browser.

15. A computer-readable medium storing instructions for performing a method for controlling advertisement viewing frequency, the method executed by a processor and comprising steps executed by the processor of:
    sending, by a processor, instructions to display an advertisement to a target group of users;
    determining, by the processor, a turning point time, the turning point time corresponding to a time at which a predetermined number of users within the target group have viewed the advertisement a target number of times, the advertisement being displayed to the users via one or more websites; and after the determined turning point time has been reached, sending instructions to display the advertisement only to the users in the group who have already seen the advertisement at least once before.

16. The computer-readable medium of claim 15, wherein the advertisement is displayed to the target group of users based on the tendency of the users in the group to return to the one or more websites.

17. The computer-readable medium of claim 16, wherein the tendency of the users in the group to return to the one or more websites is determined by accessing one or more cookies stored on the computers of the users.

18. The computer-readable medium of claim 16, wherein the tendency of the users in the group to return to the one or more websites is derived from one or more virtual cookies.

19. The computer-readable medium of claim 18, wherein the one or more virtual cookies are derived from one or more of an IP address, browser type, geographic location, connection speed, or other session level data.

20. The computer-readable medium of claim 15, wherein the target group is formed by associating users with at least one attribute.

21. The computer-readable medium of claim 20, wherein attributes may be selected from the group of sex, age, job status, income level, time of day of connection to internet, type of internet connection, and type of internet browser.

* * * * *